US005248448A

United States Patent [19]

Waldron et al.

[11] Patent Number: 5,248,448

[45] Date of Patent: Sep. 28, 1993

[54] AEROSOL GENERATOR APPARATUS WITH CONTROL AND RECORDING MEANS

[76] Inventors: J. David Waldron, 603 Pine Point Cir.; David W. Waldron, 3325 Plantation Dr., both of Valdosta, Ga. 31602; Kern R. Walcher, 1007 Williamsburg La., Norcross, Ga. 30093; Sidney P. Swanson, 6696 N. 79th Pl., Scottsdale, Ariz. 85250; Richard J. Curry, 3946 E. Dulciana Ave., Mesa, Ariz. 85206; Norman L. Shanks, 6902 E. Redfield Rd., Scottsdale, Ariz. 85254; Barry G. Waymire, 5343 E. Taylor, Apt. #113, Phoenix, Ariz. 85008

[21] Appl. No.: 669,912

[22] Filed: Mar. 15, 1991

Related U.S. Application Data

[63] Continuation-in-part of Ser. No. 650,281, Feb. 4, 1991, which is a continuation of Ser. No. 265,527, Nov. 1, 1988, Pat. No. 4,992,206.

[51] Int. Cl.[5] .......................... B05B 7/10; B05B 9/06; C09K 3/30

[52] U.S. Cl. ...................................... 252/305; 239/77; 239/338; 239/403; 239/405; 261/18.1; 261/78.2; 424/43

[58] Field of Search .................... 424/43, 405; 239/77, 239/86, 338, 403, 405; 261/18.1, 78.2

[56] References Cited

U.S. PATENT DOCUMENTS

| | | | |
|---|---|---|---|
| 3,552,652 | 1/1971 | Greenwood | 239/77 |
| 3,666,177 | 5/1972 | Mencacci | 239/77 |
| 3,702,306 | 11/1972 | Waldron | 252/305 |
| 3,917,168 | 11/1975 | Tenney | 239/13 |
| 4,111,364 | 9/1978 | Schroeder | 239/77 |
| 4,288,036 | 9/1981 | Jubinville | 239/346 X |
| 4,630,773 | 12/1986 | Ortlip | 239/1 |
| 4,992,206 | 2/1991 | Waldron | 252/305 |

FOREIGN PATENT DOCUMENTS

| | | | |
|---|---|---|---|
| 2813490 | 10/1978 | Fed. Rep. of Germany | 239/77 |

*Primary Examiner*—Richard D. Lovering
*Attorney, Agent, or Firm*—Hopkins & Thomas

[57] ABSTRACT

An aerosol generator apparatus 10 for mounting on a vehicle for dispensing minute quantities of liquid in a primary airstream to form a fog having finely divided droplets of liquid entrained therein includes an air blower 16, an air duct 18 mounted in communication with the air blower, a nozzle assembly 20 mounted in communication with the air duct, and liquid delivery means 49 for delivering a quantity of liquid to the nozzle assembly. Control means 31, 38 responsive to the speed of the vehicle are provided for controlling the airstream pressure delivered to the nozzle for maintaining the size of droplets of liquid in the fog within a selected range despite variations in the speed of the vehicle. A LORAN unit 32 is provided for sensing the vehicle's location and the control means 31 is adapted for recording when, where and how much liquid was dispensed.

30 Claims, 4 Drawing Sheets

AEROSOL GENERATOR APPARATUS WITH CONTROL AND RECORDING MEANS

CROSS-REFERENCE TO RELATED APPLICATIONS

The present application is a continuation-in-part of U.S. application Ser. No. 07/650,281, filed on Feb. 4, 1991 and entitled "AEROSOL GENERATOR APPARATUS AND METHOD OF USE", which is a continuation of U.S. application Ser. No. 07/265,527, filed on Nov. 1, 1988 and entitled "AEROSOL GENERATOR APPARATUS AND METHOD OF USE", now U.S. Pat. No. 4,992,206, issued on Feb. 12, 1991.

TECHNICAL FIELD

The present invention generally relates to cold aerosol generators (also known as fog generators) for dispersing pesticides, defoliants, fungicides and other chemicals, and particularly relates to cold aerosol generators that are adapted to be mounted on a vehicle.

BACKGROUND OF THE INVENTION

Many of the current generation of foggers used for spraying or dispersing pesticides, defoliants, fungicides and other chemicals are known as ultra-low volume (ULV) cold aerosol generators or fog generators. Such devices normally include a prime mover such as a small gasoline-powered engine, a blower unit driven by the prime mover, a nozzle assembly, a supply tank for the chemical, and a suitable control means. The chemical is normally fed into the nozzle assembly where it is entrained in the airstream flowing therethrough and is dispersed into the atmosphere as a fog of small droplets. The droplets typically range in size from approximately five (5) to twenty (20) microns. The generators are also normally self-contained units and are removably mounted in or on a vehicle, utilizing, for example, skids or similar platforms. A typical use for such generators is to dispense insecticide as part of a mosquito eradication program.

One problem associated with known cold aerosol generators is the difficulty of ensuring that the chemical is applied in an appropriate fog and at a desired rate, despite variations in the operation of the vehicle. For example, it is important to maintain a proper average droplet size in the fog to comply with legal regulations for the particular chemical being applied and to maintain the effectiveness of the chemical fog. Legal regulations are promulgated by the U.S. Environmental Protection Agency and by state and local governments and typically limit the maximum particle size in the fog and the maximum application rate per unit area. On the other hand, it has been observed in the art that droplets below a certain size are ineffective because they often fail to engage the target plant or insect, and it has been theorized that the surface tension of the liquid droplets and the surface tension of the atmosphere directly adjacent the target somehow inhibit the smaller droplets from contacting the surface of the target. Also, in order for the chemical to have the desired effect, the chemicals normally must be applied at or above a minimum application rate per unit area. Thus, for each chemical being applied there is a desired range of droplet sizes and application rates. Furthermore, each chemical typically has an ideal or preferred droplet size and application rate.

Ensuring that the chemical is applied in a fog having droplets falling within the desired droplet size range and at a rate within the desired rate range is greatly complicated by the fact that the vehicle used to transport the aerosol generator does not travel at a constant speed, but rather the vehicle typically stops, starts, and travels at widely varying speeds. It has been known in the art to operate the blower at a constant speed, thereby delivering air at a constant pressure to the nozzle, and to vary the rate of chemical supplied to the nozzle in response to changes in the vehicle speed in order to maintain a desired application rate. Unfortunately, this simple technique is generally unsatisfactory for maintaining a desired droplet size. This is so because at a given air pressure delivered to the nozzle, a low rate of delivery of chemical results in small droplets, while a high rate of delivery of chemical results in large droplets.

Another problem associated with known aerosol generators is that of ensuring and verifying that the chemical is applied at the correct rate and is applied over the proper areas and not elsewhere. Complete coverage of the target area is necessary to provide an effective eradication program, while coverage of areas outside the target area is wasteful. Also, verifiable records of what, where, and how much chemical was applied can provide significant protection against a subsequent legal claim by another that the spraying caused damage or injury, either directly or collaterally. In the past it has been common to instruct the operator of the vehicle on where and how much chemical to apply and to rely on the operator to recall or record where and how much chemical was applied. Unfortunately, such recollections or records of the operator are prone to be less than completely reliable. This is so because the human operator can incorrectly perceive his location and the application rate at the time of spraying, can err in recording or recalling the locations and rates, or can intentionally misstate or misrecord the locations and rates of spraying. Furthermore, the amount of information to be recorded or recalled can be voluminous if any detailed record is desired.

In the art of spreading liquid fertilizer over agricultural fields from a moving vehicle it has been known to use location-sensing equipment to proactively control the spreading of liquid fertilizer. For example, U.S. Pat. No. 4,630,773 of Ortlip discloses a method and apparatus for spreading fertilizer using a digital soil map of the various soil types in the field to be fertilized. A LORAN unit is used to determine the current location of the vehicle carrying the fertilizer in relation to the map to determine the local soil type. The application of the fertilizer is then automatically controlled in response to the vehicle s location and the local soil type. While the method and apparatus according to Ortlip may have some applicability in spreading liquid fertilizer over agricultural fields, it is considered to have little applicability to spraying chemicals in a fog using a cold aerosol generator. This is so because in using cold aerosol generators, such as for spraying insecticides in populated areas, it is important that the operator retain primary control responsibility, rather than using fully automatic control, so that the operator can quickly and easily adapt to changing circumstances. For example, if it is raining it is probably prudent to discontinue spraying a pesticide fog because the fog tends to be broken up rather quickly by falling rain. Also, if children are observed chasing after the vehicle and playing in the fog, the operator should immediately halt the spraying of the fog and should admonish the children to stay out of the fog.

Accordingly, it can be seen that a need remains for a cold aerosol fog generator apparatus and method which is responsive to human control, which maintains the application rate and droplet size within desired ranges, and which records where, when and how much chemical has been applied. It is to the provision of such a cold aerosol generator apparatus and method that the present invention is primarily directed.

SUMMARY OF THE INVENTION

Briefly described, in a preferred form the invention comprises an aerosol generator apparatus for mounting on a vehicle for dispensing minute quantities of liquid in a primary airstream to form a fog having finely divided droplets of the liquid entrained therein. The aerosol generator apparatus comprises air blower means for producing an airstream, duct means mounted in communication with the blower means and including an outlet end, and a nozzle assembly mounted in fluid communication with the outlet end, the duct means being adapted for delivering the airstream to the nozzle assembly under pressure liquid delivery means are mounted in fluid communication with the nozzle assembly for delivering a small quantity of liquid to the nozzle, the nozzle being adapted for dispersing the liquid in the airstream. Control means are provided which are responsive to the speed of the vehicle for controlling the pressure of the airstream delivered to the nozzle for maintaining the size of droplets of liquid in the fog within a selected range despite variations in the speed of the vehicle. Preferably, the control means includes a pressure regulator valve mounted in the duct means for bleeding off excess pressure, whereby the air blower means can be driven at a constant speed by a prime mover, providing an effective and simple control of the pressure delivered to the nozzle.

The invention also comprises a method for dispensing minute quantities of liquid in the primary airstream to form a fog having finely divided droplets of the liquid entrained therein. The method comprises the steps of mounting an aerosol generator on a vehicle, operating the vehicle to move at a speed, producing an airstream under pressure with an air blower means, delivering the airstream under pressure to a nozzle, delivering a quantity of liquid to the nozzle for dispersing the liquid in the airstream, monitoring the speed of the vehicle, and controlling the airstream pressure delivered to the nozzle in response to changes in the speed of the vehicle.

In another preferred form, the present invention comprises an aerosol generator for mounting on a vehicle for dispensing minute quantities of liquid in a primary airstream to form a fog having finely divided droplets of the liquid entrained therein. The aerosol generator apparatus comprises an air blower means for producing an airstream, duct means mounted in fluid communication with the blower means and including an outlet end, and a nozzle assembly mounted in fluid communication with the outlet end, the duct means being adapted for delivering the airstream to the nozzle assembly under pressure. Liquid delivery means are mounted in fluid communication with the nozzle assembly for delivering a quantity of liquid to the nozzle and the nozzle is adapted for dispersing liquid in the airstream. Means are provided for monitoring the rate of the liquid being dispensed from the nozzle. Other means are provided for sensing the vehicle's speed, and for sensing the vehicle's location, such as with a LORAN unit. Recording means are Provided for recording the rate of liquid dispensed from the nozzle and recording the vehicle's location and speed as the vehicle is operated to establish a record of how much and where liquid has been dispensed.

Accordingly, it is a primary object of the present invention to provide an aerosol generator apparatus and method which is effective in its use, economical to manufacture, and durable in construction.

It is another object of the present invention to provide an aerosol generator apparatus and method which is capable of maintaining a desired application rate and a desired droplet size within selected ranges despite changes in vehicle speed.

It is another object of the present invention to Provide an aerosol generator apparatus which records where, when, and how much chemical has been applied.

It is another object of the present invention to provide a method and apparatus for applying liquid chemical in an aerosol fog and for automatically recording where chemical has been applied.

It is another object of the present invention to Provide an aerosol generator apparatus which is capable of recording when, where and how much chemical has been dispensed, while at the same time retaining in the human operator the primary control functions.

It is another object of the present invention to provide an aerosol generator apparatus which is capable of generating an effective fog, within a selected application rate range, despite variations in vehicle speed.

Other objects, features, and advantages of the invention will become apparent upon reading the following specification in conjunction with the accompanying drawing figures.

BRIEF DESCRIPTION OF THE DRAWING FIGURES

DETAILED DESCRIPTION OF THE PREFERRED EMBODIMENT

Figure 1:
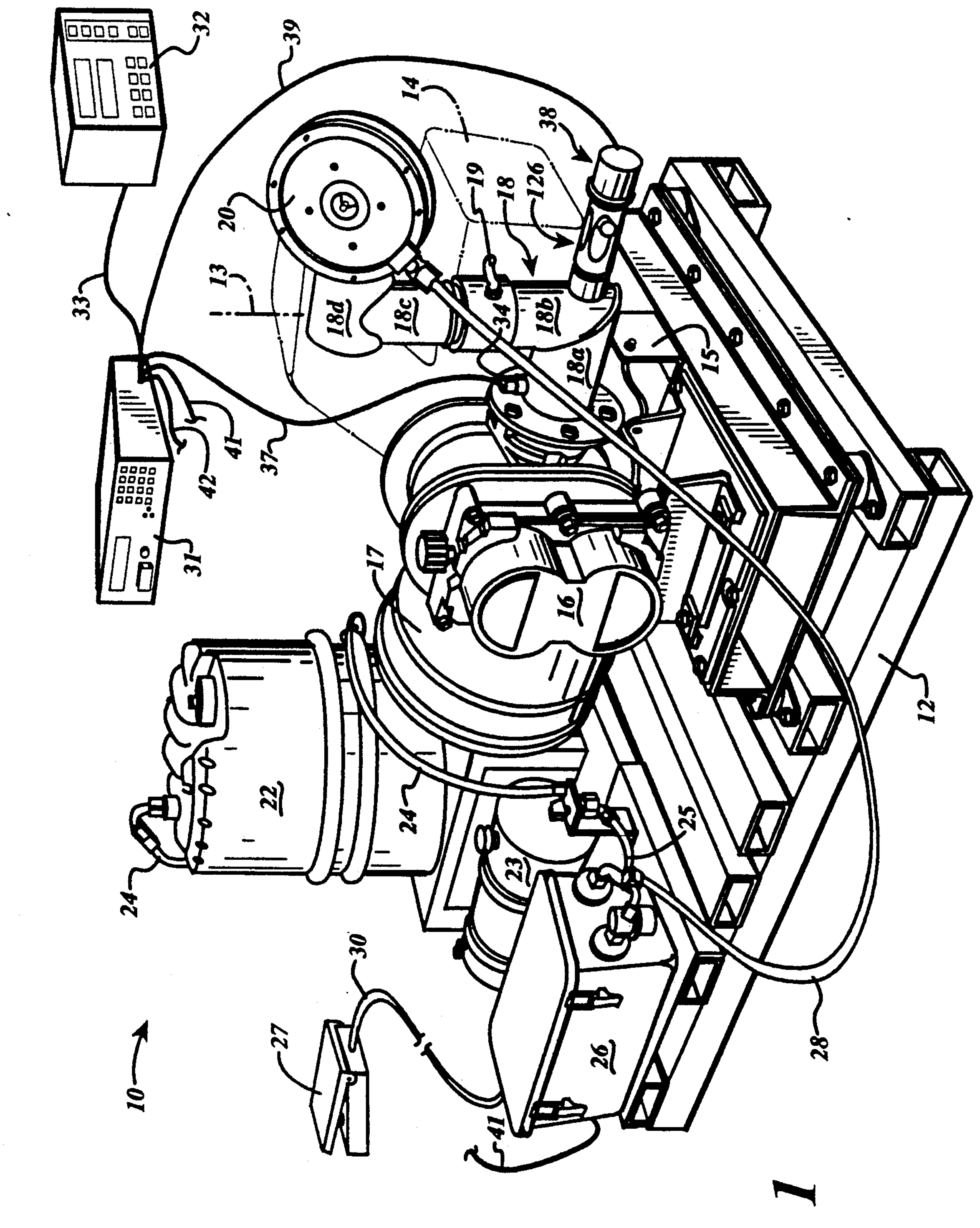
FIG. 1 is a perspective, schematic illustration of an aerosol generator apparatus according to a preferred form of the invention.

Referring now in detail to the drawings, in which like reference numerals represent like parts throughout the several views, FIG. 1 shows an aerosol fog generator apparatus 10, shown mounted on a skid 12 for removably mounting the generator apparatus in a vehicle or the like (not shown). The unit is normally powered by a conventional prime mover 14 having a starter control 15, the prime mover typically comprising a gasoline engine or electric motor. In a commercial embodiment contemplated by the applicants, the engine is an air-cooled, a sixteen horsepower gasoline engine. The engine 14 powers a positive displacement blower 16, a suitable blower being capable of moving 250 cu. ft/min. of air at a pressure of 8 p.s.i.

The output of the blower 16 is delivered through duct assembly 18 to the spray nozzle assembly 20. The generator shown here includes a single nozzle assembly; however, the unit may be equipped with two or more nozzles, depending on the particular application for which the generator apparatus 10 is used. A typical application of pesticide for mosquito control delivers 4.3 fl. oz./min at 4–6 p.s.i. through a single spray nozzle, with a nominal vehicle speed of 10 m.p.h. The pesticide used for mosquito control typically is malathion which can lawfully be dispensed as droplets with an average size of no greater than 17 microns. An average droplet size of below 10 microns has been found to be ineffective. A desired droplet size is 11 microns and an acceptable range is between 10 and 15 microns.

Blower 16 has an inlet associated with a large capacity air filter 17 for drawing air in and an outlet associated with a first segment 18*a* of duct 18 for expelling pressurized air. First segment 18*a* is oriented horizontally and is attached to a vertical second segment 18*b*. A vertical third segment 18*c* is rotatably mounted to second segment 18*b* for rotation about axis 13 and is releasably secured in place by bolt 19. A horizontal fourth segment 18*d* is mounted to third segment 18*c* and supports nozzle 20. If desired, segment 18*d* can be adapted to support two nozzles.

The chemical is stored in supply tank 22 and is delivered therefrom through conduit 24 to a flow control unit 26. The flow control unit is calibrated to deliver the desired amount of fluid through conduit 28 to nozzle 20.

The generator unit also is supplied with an auxiliary tank 23 which contains a suitable solvent or similar fluid for flushing the unit apparatus 10 after use. The solvent is delivered through conduit 25 to the flow control unit 26 and from there follows the same path as the pesticide or other chemical through the conduit 28 to the nozzle. The solvent is pumped through the conduit 28 and is blown through the nozzle assembly for cleaning the nozzle.

The apparatus 10 also includes a control and recording console 31 for controlling certain aspects of the performance of the apparatus and for recording where, when, and how much chemical has been applied. The control and recording console 31 is described in more detail below. A LORAN navigational unit 32 is used to determine the location of the vehicle for the above-identified purpose of recording where the chemical has been applied. LORAN unit 32 is electrically coupled to the control and recording console 31 by means of cabling 33. Alternatively, a Ground Positioning Satellite Receiver ("GSPR") unit can be used in place of the LORAN unit.

A pressure-sensing transducer 34 is mounted to the first segment 18*a* of the duct assembly 18 for monitoring the air pressure (relative to ambient air pressure) developed within the duct assembly and communicated to the nozzle assembly 20. The pressure transducer 34 is electrically coupled to the control and recording console 31 by means of a cabling 37. A pressure regulator assembly 38 is mounted to the duct assembly 18 and is electrically coupled to the control and recording console 31 by means of cabling 39. While the pressure regulator assembly 38 is shown in FIG. 1 mounted horizontally and extending laterally from second segment 18*b*, for purposes of protecting the pressure regulator assembly from damage from accidental contact, the pressure regulator assembly can be mounted to an underside portion of first segment 18*a* so that the pressure regulator assembly is oriented vertically and does not extend laterally.

Control and recording console 31 is also electrically coupled to the flow control 26 by means of cabling 41 and to an unshown speedometer of the vehicle by means of cabling 42. Many modern trucks and automobiles have a speed pickup built into the transmission so that the vehicle can be equipped easily with cruise-control (speed control). Such speed pickups typically produce a digital signal which is readily used by the present invention to determine the vehicle's speed. In mounting the present invention to a vehicle lacking such a speed pickup, a speed transducer is mounted in-line with the vehicle's mechanical speedometer cable to produce an electronic signal representing the vehicle's speed.

Figure 2:
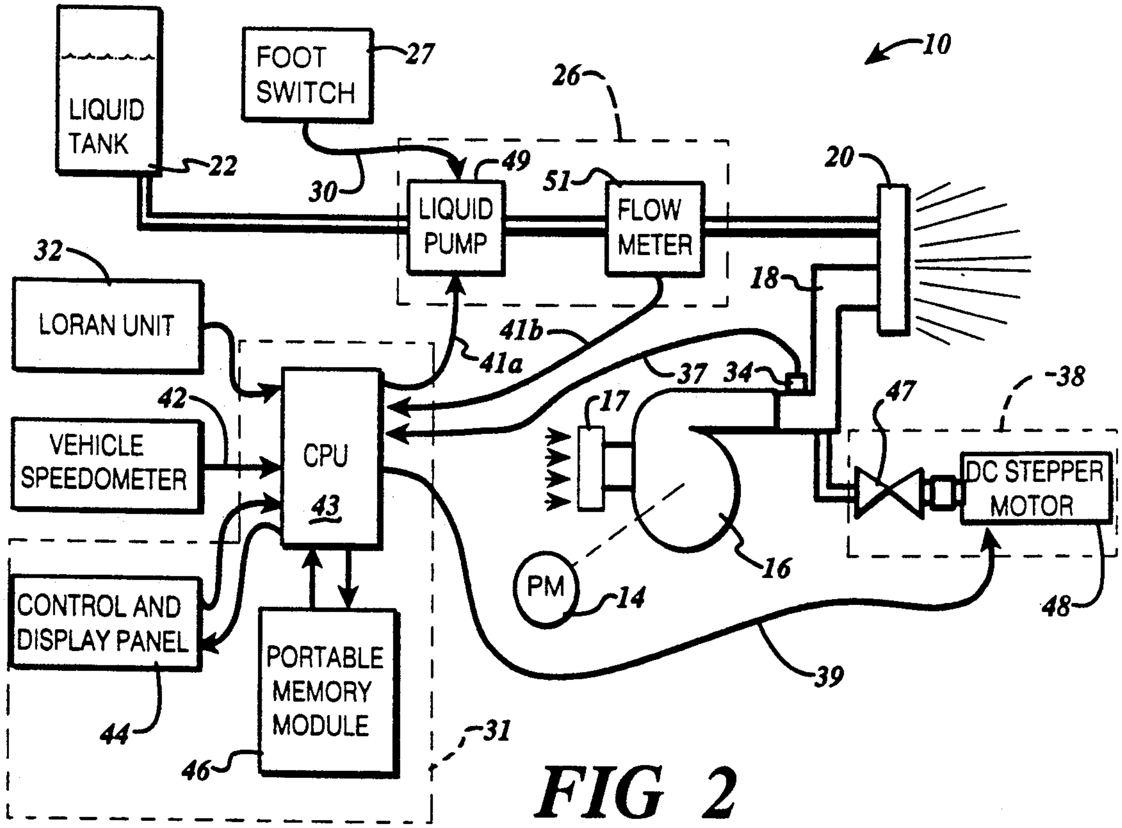
FIG. 2 is a schematic illustration of the aerosol generator apparatus of FIG. 1.

As shown schematically in FIG. 2, the control and recording console 31 includes a microcontroller 43 operably connected with a control and display panel 44. A portable memory module 46 is removably connected with the microcontroller 43 for transferring parameters from a separate, unshown computer to the microcontroller and for transferring recorded data from the microcontroller to the separate, unshown computer.

As FIG. 2 shows, pressure regulator assembly 38 comprises an adjustably operable valve 47 and a DC stepper motor 48 mounted for driving the operable valve. Flow control unit 26 is seen to include a high-precision, low-volume liquid pump assembly 49 intermediate the liquid tank 22 and the nozzle 20, and a high-precision, low-volume, positive displacement flow meter 51 intermediate the nozzle 20 and pump 49. Pump assembly 49 includes a positive displacement chemical pump, a 12vdc motor driving the chemical pump, and an RPM sensor for monitoring the speed of the pump. As shown in FIG. 2, cabling 41 includes an electrical cable 41*a* for connecting the microcontroller 43 with the driving motor of the liquid pump assembly 49 for controlling the operation of the liquid pump and electrical cabling 41*b* extending between the microcontroller 43 and the flow meter 51 for communicating to the microcontroller the amount of liquid flowing to the nozzle as sensed by the flow meter.

Figure 4:
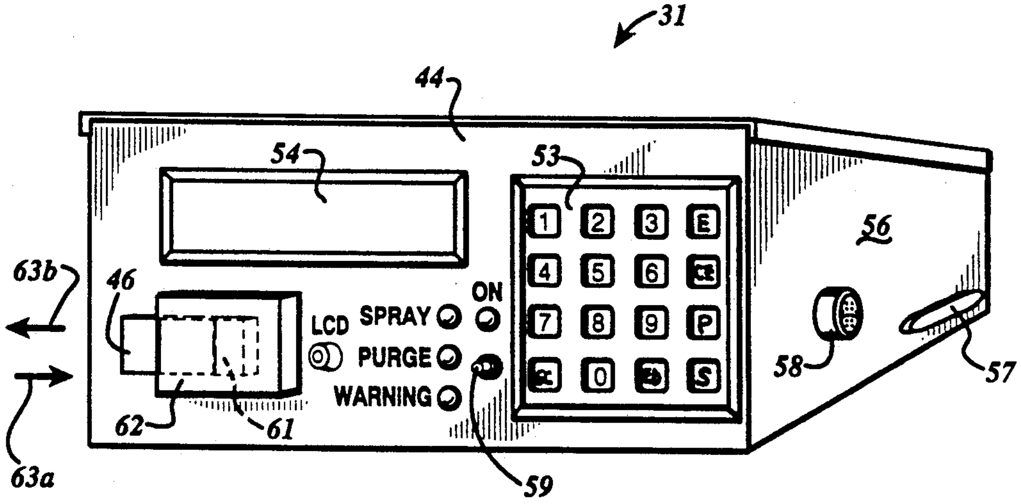
FIGS. 4 and 5 are perspective, schematic illustrations of portions of the aerosol generator apparatus of FIG. 1.

As shown in FIG. 4, the control and recording console 31 has a front facing control and display panel 44 bearing a keypad 53 and an LCD display a 54. A side panel 56 bears an RS-232 port connector 57 for connecting the internally-mounted microcontroller 43 with, inter alia. the LORAN unit, the flow meter, etc. A 26-pin round connector 58 also is mounted on the side panel 56 for connecting the internally-mounted microcontroller with the pressure regulator valve 38, among other things. LED warning lights labeled "Spray", "Purge", and "Warning" are mounted beneath the LCD display. A main power switch 59 is mounted between the LED warning lights and the keypad 53. An LED indicator light labeled "ON" is positioned above the main power switch 59 for indicating operation of the control and recording console. Portable memory module 46 is removably mounted to an electrical connector 61 and is protected when so mounted to the connector by a protective crush box 62 mounted to the panel 44. Crush box 62 has an open end on one side thereof through which the portable memory module 46 can be inserted and removed by moving the portable memory module right and left in the directions of direction arrows 63*a* and 63*b*.

KeyPad 53 includes numeric keys labeled 1–9 and 0 and function keys, including function keys labeled "P"

and "S". Function key "S" stands for "spray" and initiates and halts the fogging by controlling operation of the flow control unit 26. Function key "P" stands for "purge" and initiates a purge sequence.

Alternatively, a footswitch, such as footswitch 27 shown in FIGS. 1 and 2, can be used to initiate and halt operation of the fogging. The footswitch 27 is normally mounted in the vehicle cab and is connected to the flow control unit by cable 30.

The microcontroller 43 is adapted for controlling the operation of the chemical pump and for recording where, when, and how much chemical has been applied. The microcontroller includes a number of well-known components such as a microprocessor, a clock/calendar chip, RAM memory, 32K EPROM programmed with firmware, an RS-232 interface, an interface for a memory module, a small battery for powering the clock/calendar and for backing up the RAM, analog and digital signal conditioning and protection circuitry, an analog 8-1 multiplexer, and an 8 bit analog-to-digital converter. The microcontroller also includes interfaces for an alphanumeric LCD display, for discrete LED's, for driving a 12 volt DC solenoid, for receiving a signal from the vehicle's speed transducer, for receiving a signal from the LORAN unit and for receiving signals from discrete switches.

The memory module 46 contains pre-programmed Parameters and specifications and communicates the same to the microcontroller 43. The memory module optionally can be reprogrammed by the operator of the vehicle with the use of an appropriate security code, using the keypad 53 of the console 31. The memory module stores information addressed to it by the microcontroller as specified by the microcontroller's firmware. Among the information first transferred from the memory module to the microcontroller when the memory module is plugged into the front Panel are the following: maximum vehicle speed allowed (spraying), maximum vehicle speed allowed (non-spraying), maximum pressure delivered to the blower, type of chemical being dispensed, nominal flow rate for 10 miles per hour, record sampling rate (spraying), record sampling rate (non-spraying), chemical calibration information, and speed calibration information.

The portable memory module 46 is sold under the name "PSION ORGANISER II". The memory module is normally sold as part of a package adapted for data collection, including a hand-held keypad. For connecting the portable memory module 46 with an unshown external computer, a suitable cable 66 including a "smart" connector 67 is employed. The "smart" connector includes internal electronics for controlling communication between the portable memory module 46 and an external computer to manage the uploading of information from the portable memory module to the computer. The cable and "smart" connector combination is also commercially available as the "PSION COMMS LINK".

Among the information recorded in the memory module 46 from the microcontroller 43 are the following: a code identifying the area (in general) of spraying, a code indicating the vehicle operator, the date and time, the speed of the vehicle, the mode of operation (spraying or not spraying), the rate of chemical dispensed, the volume of chemical dispensed since last record was written, the position of the vehicle in latitude and longitude, the distance travelled since the last record was written, any warning codes regarding errors, and the pressure delivered from the blower to the nozzle.

Figure 6:
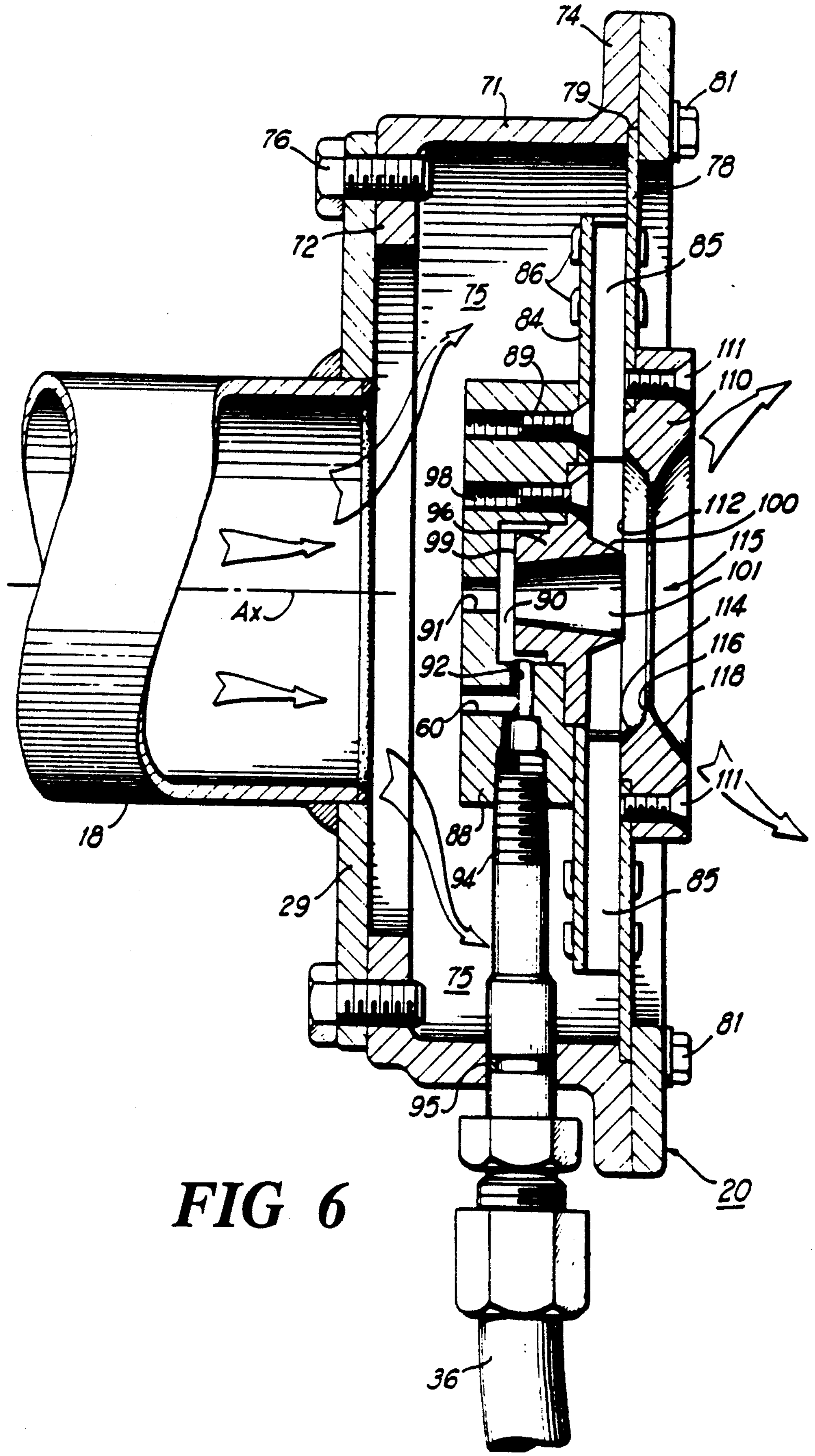
FIG. 6 is a partially cut-away view of a nozzle portion of the aerosol generator apparatus of FIG. 1.

Referring now to FIG. 6, a detailed cross-section of the nozzle assembly is illustrated. The nozzle assembly is essentially similar to that shown in U.S. Pat. No. 3,702,306 for a Fogging Method and Apparatus, which is commonly owned with the present application, and portions of which are incorporated herein by reference.

Referring more specifically to FIG. 6, it can be seen that the nozzle assembly 20 includes an annular housing 71 having an inwardly-directed mounting flange 72 at the left or inlet end as seen in FIG. 6 and an outwardly-directed positioning flange 74 at the discharge or right end thereof as seen in FIG. 6. The housing 71 defines an air receiving chamber 75 therein closed at the inlet end thereof by mounting flange 29 connected to the mounting flange 72 through appropriate bolts 76 and partially closed at the discharge end thereof by an annular positioning plate 78. The positioning plate 78 is received in an appropriately formed recess 79 in the forward edge of housing 71 by nut and bolt assemblies 81. The positioning plate 78 is washer-shaped providing a central aperture therethrough.

A secondary positioning plate 84, which is also washer-shaped but having smaller outside and inside diameters, is positioned behind the plate 78 toward the inlet side of the housing 71 by a plurality of arcuate-shaped vanes 85 which are arranged along a spiral path relative to the axis AX of nozzle assembly 20. The vanes 85 are connected to plates 78 and 84 through locking tabs 86. The inside passage through secondary positioning plate 84 is closed by a mounting block 88 connected to plate 84 through screws 89 extending from plate 84 toward the chamber 75 and the inlet end of housing 71.

Block 88 is made of plastic or some other non-corrosive material and defines therein a centrally-located fluid recess 90 extending into block 88 from the discharge side of housing 71. A centrally-located, axially-extending passage 91 is also defined through block 88. Passage 91 is centrally located with respect to recess 90 and communicates with chamber 75 at one end thereof and with recess 90 at the other end thereof. Hose 36 supplying fluid to the nozzle assembly 20 communicates with recess 90 in the block 88 through a radially-extending port 92 communicating with the recess 90 and with hose 36 through appropriate fitting 94 connected to block 88 through housing 71. To prevent seepage and to aid in sealing chamber 75, a viton O-ring 95 is provided around fitting 94. Therefore, it can be seen that fluid supplied through the hose 36 is supplied to the recess 90. It can also be seen that part of the air supplied to chamber 75 through duct 18 is supplied through passage 91 to the recess 90.

A nozzle plate 96 having an outside diameter coinciding with the inside diameter of the plate 84 and received in positioning recess in the face of the block 88 adjacent to the discharge side of the housing 71 partially closes the recess 90 in block 88. The nozzle plate 96 is maintained in position on the block 88 by a plurality of screws 98. The nozzle plate 96 defines an outstanding collar 99 extending from one side of the plate 96 toward the inlet side of housing 71 to a position spaced from the bottom of recess 90 when the plate 96 is in position. The outside of the plate 96 is adjacent to the discharge side of housing 71 and is concentrically located about axis AX. A nozzle passage 101 is defined through the plate 96, collar 99, and nozzle flange 100. This nozzle passage 101 is concentrically-located with respect to the axis AX and is larger in diameter than the Passage 91 through the block 88. A deflection member 110 is carried on the discharge side of plate 78 and reduces the effective diameter of the central aperture therethrough. The deflection member 110 is maintained in position by screws 111 engaging plate 78 and positions the member 110 so that the inside surface thereof is in alignment with the forward surfaces of vanes 85 extending toward the discharge side of housing 71. Member 110 defines an inwardly-tapering annular surface 112 concentric about axis AX. Surface 112 begins just inwardly of the inner ends of vanes 85 and extends toward the discharge side of nozzle assembly 20 to terminate in an annular surface 114 concentric with axis AX. Surface 114 terminates in an annular knife edge 116 defining a passage 115 aligned with axis AX and appreciably larger than passage 101 and spaced forwardly thereof. While the exact dimensions and proportions of the same may vary with different fluids and conditions, it has been found that a passage 101 that is 7/10 inch in diameter with passage 115 being 1 1/16 inches in diameter and spaced from flange 100 about 3/16. inch produces a satisfactory operation. An outwardly-flaring concave annular surface 118 extends from edge 116 to the discharge side of member 110 and is concentric with axis AX.

Figure 3:
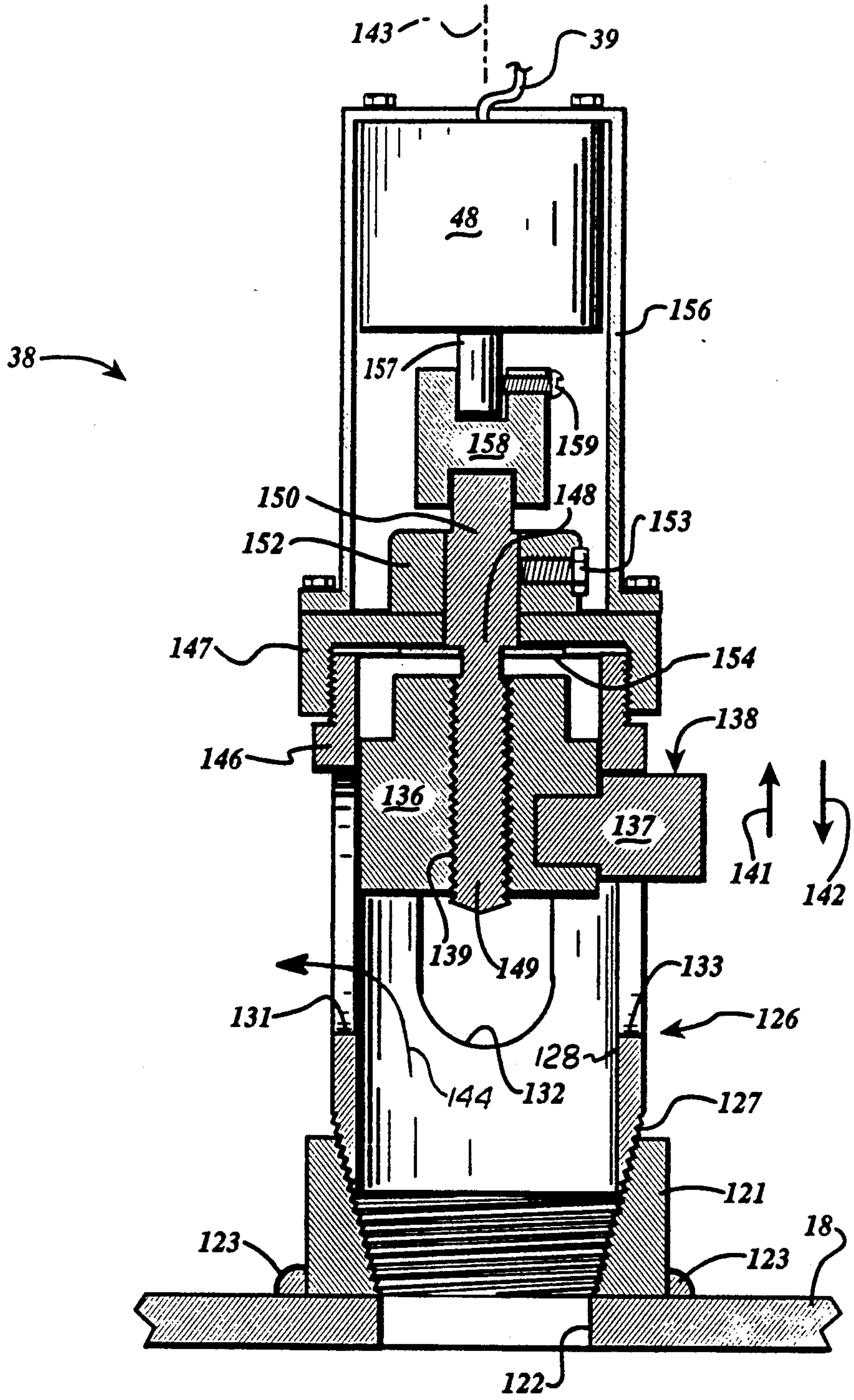
FIG. 3 is a schematic, sectional view of a portion of the aerosol generator apparatus of FIG. 1.
Figure 5:
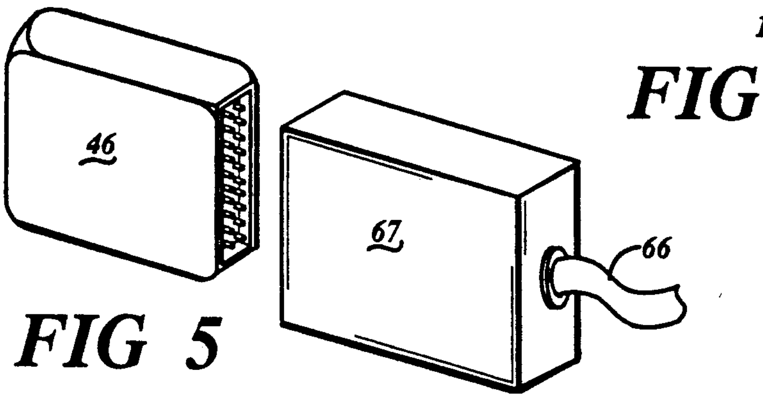

Turning now to FIG. 3, attention is directed to details of the pressure regulator assembly 38. A boss 121 with internal pipe threads is mounted adjacent an opening 122 formed in the side wall of the duct assembly 18. The boss is mounted and sealed to the duct assembly by weldments 123. The boss is a short, cylindrical element and receives therein a body portion 126 of the pressure regulator valve assembly 38. The body 126 is a hollow, elongated cylinder with one end having tapered pipe threads 127 formed thereon for mounting the body to the boss 121. As shown in FIGS. 1 and 3, the cylindrical body 126 defines a number of elongated slots 131, 132, and 133 (and an unshown fourth slot). A smooth, cylindrical bore 128 is formed inside body 126 and is interrupted by the elongated slots. A generally cylindrical piston 136 is slidably mounted within the interior of the cylindrical body 126 and is closely fitted to bore 128. A pin 137 is securely mounted to the piston 136 and extends outwardly through slot 133. Pin 137 is slightly smaller in diameter at its enlarged end indicated at 138 than the smaller aspect of the slot 133; thus, the Pin can slide up and down in the direction of direction arrows 141 and 142 within the slot 133, while preventing the piston 136 from rotating with respect to a central axis 143 extending through the pressure regulator assembly 38.

An upper portion 146 of the cylindrical body 126 is threaded to receive a threaded cap 147. A threaded shaft 148 having a lower threaded Portion 149 and an upper unthreaded portion 150 is rotatably mounted within a central opening formed in the threaded cap 147. A collar 152 is secured to the upper, unthreaded portion 150 of the shaft 148 with a suitable threaded fastener 153. The collar so secured prevents the shaft 148 from translating downwardly in the direction of direction arrow 142. A thrust washer 154 is mounted about shaft 148 beneath threaded cap 147 and is held in place thereagainst by an unshown retaining clip mounted to the shaft. So secured, the thrust washer prevents the shaft from translating upwardly in the direction of direction arrow 141. Thus, the shaft 148 is rotatably mounted to the threaded cap 147 and is prevented from axial movement with respect to the threaded cap. Threaded portion 149 of the threaded shaft 148 is threadedly received within a central threaded bore 139 of the piston 136. With this arrangement, rotation of the shaft 148 causes upward or downward movement of the piston 136, depending upon the direction of rotation of the shaft. Pin 137 riding within slot 133 prevents the piston 136 from simply rotating with the shaft, thereby ensuring proper movement of the piston. Pin 137 and slot 133 also limit the ultimate upward and downward travel of piston 136.

A cylindrical housing 156 is bolted to threaded cap 147 at one end thereof and at an opposite end thereof a DC stepper motor 48 is bolted to the cylindrical housing 156. The stepper motor is coupled to the control and recording console 31 by cabling 39 so that the operation of the stepper motor can be controlled by the console. The output shaft 157 of DC stepper motor 48 is coupled to unthreaded upper portion 150 of shaft 148 by means of coupling member 158. One end of coupling member 158 is secured to the output shaft 157 with a screw 159 while the other end of the coupling member includes a square recess for slipping over the square head of the upper portion 150 of the shaft for driving the shaft in rotation.

OPERATION

The mechanical operation of the aerosol generator apparatus is well-described in U.S. Pat. No. 4,992,206 and that portion of said Patent is herein incorporated by reference. The Present discussion will focus largely on control and recording aspects of the present invention.

The microcontroller 43 accepts input from the memory module 46 in the form of operational specifications or Parameters. These parameters are used by the microcontroller in controlling operation of the various components of the apparatus. The microcontroller 43 also accepts inputs from the various sensors and transducers to determine the actual operating conditions of the apparatus. For example, the signal from pressure transducer 34 is used to determine the actual air pressure delivered to the nozzle 20. The microcontroller compares the actual, measured performance of the apparatus with the specified parameters and attempts to urge the performance of the apparatus toward compliance with the specifications. Under some circumstances, the apparatus cannot be made to perform within specifications and the microcontroller issues an error warning and records the same on memory module 46. The microcontroller also then shuts down operation of the apparatus to allow the operator an opportunity to correct the problem.

If the measured flow rate, as measured by flow meter 51, is out of tolerance (too high or too low), the microcontroller adjusts the flow rate of liquid pump 49 by raising or lowering the speed of the pump motor using electrical cabling 41*a*.

If the vehicle's speed is too high or too low, the microcontroller stops operation of the motor driving the liquid pump 49 until the vehicle's speed is once again within an allowable range. The microcontroller then restarts liquid pump 49 to proceed with normal operations.

If the pressure delivered from the blower 16 to the nozzle 20 is too high or too low, the microcontroller signals the DC stepper motor 48 through cable 39 to open or close the pressure regulator to urge the blower pressure within specifications in the manner of a feedback loop. For example, driving the stepper motor 48 in a direction to cause piston 136 to move in the direction of arrow 141 uncovers the slots, such as slot 131, and allows more air to pass through the slots as depicted by arrow 144. If the microcontroller is unable to effect a proper correction in this manner, the microcontroller stops chemical flow by shutting down liquid pump 49.

In use, the vehicle operator typically gets a pre-programmed memory module to be plugged into the console. The memory module preferably has been pre-programmed with specifications regarding the chemical to be applied, the maximum rate of chemical application, the maximum vehicle speed (both spraying and non-spraying), and other parameters. The use of a portable memory module 46 allows management personnel to exert some control over what occurs out in the field during operation of the vehicle.

After turning on the control and recording console by operation of power switch 59 and plugging the portable memory module into the control and recording console, the information contained in the portable memory module is uploaded to the microcontroller for controlling operation of the apparatus. To begin fogging, the operator pushes the function key "S" on the keypad 53. To halt fogging, the operator pushes the "S" key once again. During operation of the vehicle, the microcontroller uses the uploaded information to maintain operation of the apparatus within specified parameters, as described above. During operation of the spraying apparatus, the microcontroller records in the portable memory module where, when, and how much chemical has been applied. Specifically, the microcontroller records the I.D. of the vehicle operator, the general geographical area I.D., the latitude and the longitude of the vehicle during spraying, the application rate of chemical (the flow rate of the chemical delivered from the pump to the nozzle), the air pressure delivered to the nozzle, and the time and date of the application. The recorded information can be uploaded to an external, unshown computer by removing the portable memory module and attaching it to the unshown computer. The computer can then be manipulated to create reports of the recorded information in text or graphic format.

To make maximum use of a limited RAM storage capacity, the microcontroller does not indiscriminately record data at the same rate at all times under all circumstances. Rather, the microcontroller only records data intensively (at a high sampling rate) while the apparatus is spraying a fog. The microcontroller records data less intensively (at a lower sampling rate) when the apparatus is not spraying a fog. The microcontroller also records data upon the detection of an error condition. The data are recorded in a fashion analogous to a "bit map", with the resolution of the bits being a function of the sampling rate of the microcontroller.

As was discussed above, it has been known in the past to control the output of a pump delivering liquid chemical to the nozzle by monitoring the vehicle's speed and controlling the pump to maintain a proper application rate per unit area. Specifically, a desired flow rate from the pump is established for a nominal 10 miles per hour vehicle speed. The desired flow rate from the pump at any other vehicle speed is then calculated by multiplying the nominal flow rate at 10 miles per hour times the vehicle speed and dividing by 10. Thus, the flow rate is linearly proportional to the vehicle speed. Using such a simple control logarithm to maintain a desired application rate per unit area by varying the flow rate with the vehicle speed results in undesired variation in droplet size in the chemical fog, assuming a constant pressure delivered to the nozzle, as the vehicle is operated over a wide variety of speeds. This is so because droplet size is believed to be roughly linearly proportional to the chemical flow rate and inversely linearly proportional to the air pressure delivered to the nozzle. Thus, droplet size is believed to be Proportional to the chemical flow rate divided by the air Pressure delivered to the nozzle. As the flow rate has been shown above to be proportional to the vehicle speed, the droplet size is proportional to the vehicle speed divided by the air pressure delivered to the nozzle. In the past, it has been common to use constant air pressure supplied to the nozzle, resulting in a droplet size which increases as vehicle speed increases. By the present invention, the air pressure delivered to the nozzle is proportional to the speed of the vehicle, thereby allowing the droplet size to be held relatively constant over a wide range of vehicle speeds.

While the invention has been illustrated in preferred forms, it will be obvious to those skilled in the art that many modifications, additions and deletions may be made therein without departing from the spirit and scope of the invention as set forth in the appended claims.

We claim:

1. An aerosol generator apparatus for mounting on a vehicle for dispensing minute quantities of liquid in a Primary airstream to form a fog having finely divided droplets of the liquid entrained therein comprising,
   - an air blower means for producing an airstream,
   - duct means mounted in fluid communication with said air blower means and including an outlet end,
   - a nozzle assembly mounted in fluid communication with said outlet end, said duct means being adapted for delivering the airstream to said nozzle assembly under Pressure,
   - liquid delivery means mounted in fluid communication with said nozzle assembly for delivering a quantity of liquid to said nozzle assembly, said nozzle assembly being adapted for dispersing the liquid in the airstream, and
   - control means responsive to the speed of the vehicle for controlling the airstream pressure delivered to said nozzle for maintaining the size of the droplets of liquid in the fog within a selected range despite variations in the speed of the vehicle.

2. An aerosol generator apparatus as claimed in claim 1 wherein said control means is responsive to the speed of the vehicle for varying the quantity of liquid delivered to said nozzle from said liquid delivery means.

3. An aerosol generator apparatus as claimed in claim 1 wherein said control means comprises sensor means for sensing the pressure of the airstream delivered to said nozzle assembly.

4. An aerosol generator apparatus as claimed in claim 3 wherein said control means further comprises a pressure regulator valve mounted in fluid communication with said duct means, said pressure regulator valve being controlled in response to the pressure sensed by said sensing means.

5. An aerosol generator apparatus as claimed in claim 4 wherein said pressure regulator valve is controlled by an actuator responsive to the pressure sensed by said sensor means.

6. An aerosol generator apparatus as claimed in claim 5 wherein said actuator comprises a DC motor.

7. An aerosol generator apparatus as claimed in claim 1 wherein said control means is adapted for controlling the airstream Pressure delivered to said nozzle without controlling said air blower means.

8. An aerosol generator apparatus as claimed in claim 1 wherein said control means for controlling the airstream pressure is also responsive to the quantity of liquid delivered to said nozzle assembly.

9. An aerosol generator apparatus as claimed in claim 1 further comprising second control means responsive to the speed of the vehicle for controlling the quantity of liquid delivered to said nozzle assembly to maintain an application rate within a selected range.

10. An aerosol generator apparatus as claimed in claim 9 wherein said liquid delivery means comprises a high-precision, low-volume pump and wherein said second control means for controlling the quantity of liquid delivered comprises a liquid flow meter mounted in fluid communication with an outlet of said pump intermediate said pump and said nozzle assembly.

11. An aerosol generator apparatus as claimed in claim 1 further comprising means for monitoring the rate of liquid delivery to the nozzle, means for sensing a location of the vehicle, and means for recording the location of the vehicle, the speed of the vehicle, and the liquid delivery rate.

12. An aerosol generator apparatus as claimed in claim 11 wherein said means for sensing a location of the vehicle comprises of a LORAN unit.

13. An aerosol generator apparatus as claimed in claim 11 wherein said means for recording comprises electronic digital storage means.

14. An aerosol generator apparatus as claimed in claim 13 wherein said digital storage means includes means for transferring recorded data to an external computer.

15. An aerosol generator apparatus as claimed in claim 14 wherein said means for transferring data comprises a removable electronic memory module.

16. An aerosol generator apparatus as claimed in claim 1 further comprising of passage means having a first end communicating with said duct means and a second end communicating with said liquid delivery means for directing said airstream into said liquid delivery means for preventing entrance of liquid into said nozzle assembly.

17. An aerosol generator apparatus for mounting on a vehicle for dispensing minute quantities of liquid in a Primary airstream to form a fog having finely divided droplets of the liquid entrained therein comprising, an air blower means for producing an airstream, duct means mounted in fluid communication with said air blower means and including an outlet end, a nozzle assembly mounted in fluid communication with said outlet end, said duct means being adapted for delivering the airstream to said nozzle assembly under pressure, liquid delivery means mounted in fluid communication with said nozzle assembly for delivering a quantity of liquid to said nozzle assembly, said nozzle assembly being adapted for dispersing the liquid in the airstream, means for monitoring the rate of liquid delivery to the nozzle, means for monitoring the speed of the vehicle, means for sensing the location of the vehicle, and means for recording a location of the vehicle, the speed of the vehicle, and the liquid delivery rate.

18. An aerosol generator apparatus as claimed in claim 17 wherein said means for sensing a location of the vehicle comprises a LORAN unit.

19. An aerosol generator apparatus as claimed in claim 17 wherein said means for recording comprises electronic digital storage means.

20. An aerosol generator apparatus as claimed in claim 19 wherein said digital storage means includes means for transferring recorded data to an external computer.

21. An aerosol generator apparatus as claimed in claim 17 further comprising control means responsive to the speed of the vehicle for controlling the airstream pressure delivered to said nozzle for maintaining the size of the droplets of liquid in the fog within a selected range despite variations in the speed of the vehicle.

22. An aerosol generator apparatus as claimed in claim 21 wherein said control means comprises sensor means for sensing the pressure of the airstream delivered to said nozzle assembly and a Pressure regulator valve mounted in fluid communication with said duct means.

23. An aerosol generator apparatus as claimed in claim 22 wherein said pressure regulator valve is controlled by an actuator responsive to pressure sensed by said sensor means.

24. An aerosol generator apparatus as claimed in claim 17 further comprising control means adapted for controlling the airstream pressure delivered to said nozzle without controlling said air blower means.

25. A method of dispensing minute quantities of liquid in a primary airstream to form a fog having finely divided droplets of liquid entrained therein comprising the steps of mounting an aerosol generator apparatus on a vehicle, the generator apparatus having air blower means, duct means mounted in fluid communication with the air blower means, a nozzle assembly mounted to the duct means, and liquid delivery means mounted in fluid communication with the nozzle assembly, producing an airstream with the air blower means, directing the airstream through the duct means to the nozzle assembly, monitoring the pressure of the airstream delivered to the nozzle assembly, delivering liquid in minute quantities to the nozzle, monitoring the speed of the vehicle, adjusting the quantity of liquid delivered to the nozzle in response to variations in vehicle speed to maintain an application rate per unit area of the liquid within a desired range, and controlling the airstream pressure delivered to the nozzle in response to variations in the speed of the vehicle to maintain the size of droplets of liquid in the fog within a selected range.

26. A method as claimed in claim 25 wherein the airstream pressure is controlled by operation of a means for bleeding off unwanted pressure from within the duct means.

27. A method as claimed in claim 25 wherein the step of controlling airstream pressure delivered to the nozzle comprises monitoring the air pressure delivered to the nozzle and operating a pressure regulator valve to urge the actual pressure delivered to the nozzle toward the desired pressure.

28. A method of dispensing minute quantities of liquid in a primary airstream to form a fog having finely divided droplets of liquid entrained therein comprising the steps of mounting an aerosol generator apparatus on a vehicle, the generator apparatus having air blower means, duct means mounted in fluid communication with the air blower means, a nozzle assembly mounted to the duct means, and liquid delivery means mounted in fluid communication with the nozzle assembly, producing an airstream with the air blower means, directing the airstream through the duct means to the nozzle assembly, monitoring the pressure of the airstream delivered to the nozzle assembly, delivering liquid in minute quantities to the nozzle, monitoring the speed of the vehicle, monitoring the rate of liquid delivery to the nozzle, sensing a location of the vehicle, and recording the location of the vehicle, the speed of the vehicle, and the liquid delivery rate.

29. A method as claimed in claim 27 further comprising the step of transferring recorded data to an external computer.

30. A method as claimed in claim 27 wherein the step of sensing a location of the vehicle is performed with operation of a LORAN unit.

* * * * *